US010926973B2

(12) United States Patent
Kawanishi et al.

(10) Patent No.: US 10,926,973 B2
(45) Date of Patent: Feb. 23, 2021

(54) ELEVATOR SHAFT DIMENSIONS MEASUREMENT DEVICE AND ELEVATOR SHAFT DIMENSIONS MEASUREMENT METHOD

(71) Applicants: MITSUBISHI ELECTRIC CORPORATION, Chiyoda-ku (JP); MITSUBISHI ELECTRIC RESEARCH LABORATORIES, INC., Cambridge, MA (US)

(72) Inventors: Ryosuke Kawanishi, Chiyoda-ku (JP); Hiroyuki Tsutada, Chiyoda-ku (JP); Keisuke Sambongi, Chiyoda-ku (JP); Yu Enomoto, Chiyoda-ku (JP); Yuichi Taguchi, Cambridge, MA (US); Jay Thornton, Cambridge, MA (US)

(73) Assignees: MITSUBISHI ELECTRIC CORPORATION, Chiyoda-ku (JP); MITSUBISHI ELECTRIC RESEARCH LABORATORIES, INC., Cambridge, MA (US)

(*) Notice: Subject to any disclaimer, the term of this patent is extended or adjusted under 35 U.S.C. 154(b) by 631 days.

(21) Appl. No.: 15/579,249

(22) PCT Filed: Jun. 9, 2016

(86) PCT No.: PCT/JP2016/067209
§ 371 (c)(1),
(2) Date: Dec. 4, 2017

(87) PCT Pub. No.: WO2016/199850
PCT Pub. Date: Dec. 15, 2016

(65) Prior Publication Data
US 2018/0155155 A1    Jun. 7, 2018

(30) Foreign Application Priority Data
Jun. 9, 2015    (JP) .............................. JP2015-116368

(51) Int. Cl.
*B66B 3/02*     (2006.01)
*B66B 11/00*    (2006.01)
(Continued)

(52) U.S. Cl.
CPC .................. *B66B 3/02* (2013.01); *B66B 7/00* (2013.01); *B66B 7/1246* (2013.01); *G01B 11/02* (2013.01);
(Continued)

(58) Field of Classification Search
CPC .......... G01B 7/042; G01B 7/02; G01B 7/023; B66B 11/0005
(Continued)

(56) References Cited

U.S. PATENT DOCUMENTS 5,931,264 A * 8/1999 Gillingham ........... B66B 19/002
                                                                104/127
9,561,938 B2 * 2/2017 Kilpelainen ............ B66B 19/06
(Continued)

FOREIGN PATENT DOCUMENTS

JP    2005-098786 A    4/2005
JP    2006-062796 A    3/2006
JP    4666842 B2       4/2011

OTHER PUBLICATIONS

International Search Report dated Aug. 30, 2016 in PCT/JP2016/067209, filed on Jun. 9, 2016.
(Continued)

*Primary Examiner* — Christopher Uhlir
(74) *Attorney, Agent, or Firm* — Oblon, McClelland, Maier & Neustadt, L.L.P.

(57) ABSTRACT

Provided is an elevator shaft dimensions measurement device including: a plurality of 3-D distance image sensors which are arranged on a circumference of the same circle, facing the direction of the center of the circle and inclined
(Continued)

at an elevation angle with respect to a horizontal plane, and which output measurement data by capturing an image of a pattern irradiated onto the inner walls of an elevator shaft that are imaging objects; and a computer which integrates the measurement data output from the plurality of 3-D distance image sensors at a plurality of height positions in the elevator shaft, generates first integrated measurement data covering 360 degrees in the horizontal direction, aligns the first integrated measurement data to create second integrated measurement data after the alignment, and calculates the dimensions of the elevator shaft on the basis of the second integrated measurement data after the alignment.

15 Claims, 10 Drawing Sheets

(51) Int. Cl.
| | | |
|---|---|---|
| *G01B 11/02* | (2006.01) | |
| *G01B 11/25* | (2006.01) | |
| *G01C 7/06* | (2006.01) | |
| *G01B 11/24* | (2006.01) | |
| *B66B 7/12* | (2006.01) | |
| *B66B 7/00* | (2006.01) | |

(52) U.S. Cl.
CPC ............ *G01B 11/24* (2013.01); *G01B 11/25* (2013.01); *G01C 7/06* (2013.01)

(58) Field of Classification Search
USPC ........................................................ 187/391
See application file for complete search history.

(56) References Cited

U.S. PATENT DOCUMENTS

2010/0309452 A1    12/2010   Qiu
2011/0134439 A1    6/2011    Juvonen et al.

OTHER PUBLICATIONS

Office Action dated Aug. 29, 2020 in corresponding Indian Patent Application No. 201747043872 (with English Translation), 6 pages.

\* cited by examiner

ELEVATOR SHAFT DIMENSIONS MEASUREMENT DEVICE AND ELEVATOR SHAFT DIMENSIONS MEASUREMENT METHOD

TECHNICAL FIELD

The present invention relates to an elevator shaft dimensions measurement device and an elevator shaft dimensions measurement method for measuring three-dimensional dimensions of an elevator shaft in which an elevator car ascends and descends.

BACKGROUND ART

There is prior art technology for measuring the dimensions of an elevator shaft in which a laser distance meter capable of measuring distance by irradiating laser light in a horizontal direction is installed on an elevator car, and the three-dimensional shape of the interior of the elevator shaft is measured by movement of the car (see, for example, Patent Literature 1). In the elevator shaft internal dimensions measurement device for an elevator disclosed in Japanese Patent No. 4666842, when carrying out shape measurement, sensor position (height) information is also acquired simultaneously, by branching off and irradiating the laser light in a vertical direction.

CITATION LIST

Patent Literature

[PTL 1] Japanese Patent No. 4666842

SUMMARY OF INVENTION

Technical Problem

However, the prior art involves the following problems.
Considering the measurement of the whole elevator shaft, there are cases where a laser distance meter is used, which is capable of acquiring two-dimensional measurement data by scanning in a horizontal direction. In this case, it is possible to measure the elevator shaft three-dimensionally, by moving the elevator car on which the measurement device has been installed.

In a device configuration of this kind, in order to measure the interior of the elevator shaft more precisely, the speed of movement of the elevator car must be slowed sufficiently, to raise the spatial resolution of the laser scanning. However, when the movement speed of the elevator car is slowed, it is possible to improve the measurement accuracy, but there is a problem in that the measurement time becomes longer.

The present invention was devised in order to resolve problems of this kind, an object thereof being to provide an elevator shaft dimensions measurement device and an elevator shaft dimensions measurement method capable of measuring the three-dimensional dimensions of an elevator shaft, while achieving both improved measurement accuracy and shortened measurement time.

Solution to Problem

The elevator control device according to the present invention includes: a plurality of 3-D distance image sensors which are arranged on a circumference of the same circle, facing the direction of the center of the circle and inclined at an elevation angle with respect to a horizontal plane, so as to be capable of simultaneously measuring through 360 degrees in a horizontal direction in an elevator shaft, which irradiate a distance measurement pattern through a measurement range in the horizontal direction and a vertical direction onto inner walls of the elevator shaft that are imaging objects, and which output measurement data configured as a group of three-dimensional points by capturing an image of the distance measurement pattern irradiated onto the inner walls; a data acquirer which acquires the measurement data output respectively from the plurality of 3-D distance image sensors; a measurement data integrator which integrates the measurement data output from the plurality of 3-D distance image sensors and acquired via the data acquirer, respectively at a plurality of height positions in the elevator shaft, and generates first integrated measurement data covering 360 degrees in the horizontal direction; a measurement data alignment processor which aligns the first integrated measurement data integrated at the plurality of height positions in the elevator shaft, to create second integrated measurement data after the alignment; and a dimension calculator which calculates dimensions of the elevator shaft over the entire length of the elevator shaft, by calculating distances to the inner walls from the plurality of 3-D distance image sensors, on the basis of the second integrated measurement data after the alignment.

Furthermore, the elevator control method according to the present invention is an elevator shaft dimensions measurement method for calculating dimensions of an elevator shaft over the entire length of the elevator shaft, by data processing, using a computer, of detection results from a plurality of 3-D distance image sensors which are arranged on a circumference of the same circle, facing the direction of the center of the circle and inclined at an elevation angle with respect to a horizontal plane, so as to be capable of simultaneously measuring through 360 degrees in a horizontal direction in the elevator shaft, which irradiate a distance measurement pattern through a measurement range in the horizontal direction and a vertical direction onto inner walls of the elevator shaft that are imaging objects, and which output measurement data configured as a group of three-dimensional points by capturing an image of the distance measurement pattern irradiated onto the inner walls, the method including: a data acquisition step of acquiring the measurement data output respectively from the plurality of 3-D distance image sensors; a measurement data integration step of integrating the measurement data output from the plurality of 3-D distance image sensors and acquired in the data acquisition step, and generating first integrated measurement data covering 360 degrees in the horizontal direction; a repetition step of generating the first integrated measurement data at each of a plurality of height positions in the elevator shaft, by repeating the data acquisition step and the measurement data integration step at each height position; a measurement data alignment processing step of aligning the first integrated measurement data generated in the repetition step to create second integrated measurement data after the alignment; and a dimension calculation step of calculating dimensions of the elevator shaft over the entire length of the elevator shaft, by calculating distances to the inner walls from the plurality of 3-D distance image sensors, on the basis of the second integrated measurement data after the alignment.

Advantageous Effects of Invention

According to the present invention, it is possible to measure the whole of an elevator shaft, quickly and accurately, by arranging a plurality of 3-D distance image sensors capable of accurate three-dimensional measurement. Moreover, since the plurality of 3-D distance image sensors are arranged by an arrangement method which obtains a field of view covering 360 degrees about the periphery of the measurement device, a marked effect is obtained in that it is possible to reduce the number of sensors required and to simplify the configuration of the device.

DESCRIPTION OF EMBODIMENTS

Below, preferred embodiments of an elevator shaft dimensions measurement device and an elevator shaft dimensions measurement method according to this invention are described with reference to the drawings.

First Embodiment

Figure 1:
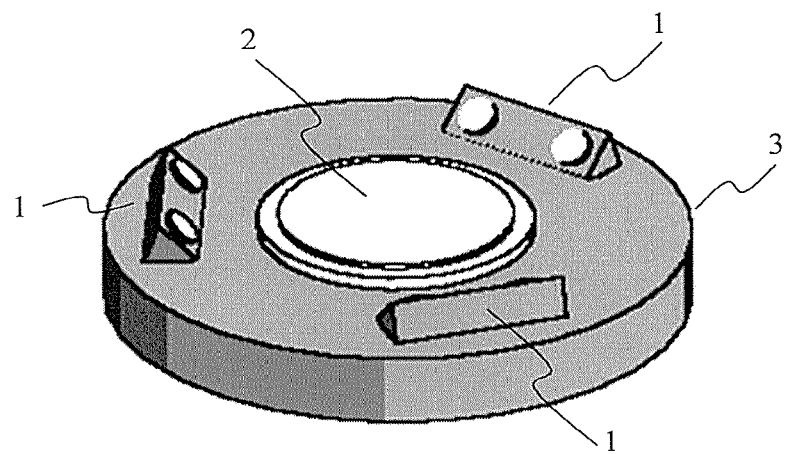
FIG. 1 is an external view of an elevator shaft dimensions measurement device according to a first embodiment of the present invention.

FIG. 1 is an external view of an elevator shaft dimensions measurement device according to a first embodiment of the present invention. The elevator shaft dimensions measurement device according to the first embodiment is configured from 3-D distance image sensors 1 arranged at a plurality of positions, a light 2 and computer 3. The 3-D distance image sensors 1 are capable of simultaneously capturing two-dimensional images and acquiring measurement data in the form of a group of three-dimensional points, in the elevator shaft which is illuminated by the light 2.

More specifically, the 3-D distance image sensors 1 are configured from a camera for acquiring color information of an imaging object, a projector, and a projector light receiving section. The camera may be a monochrome camera which acquires the brightness of the object, or may be a color camera which acquires components of the respective colors, RGB.

The projector light may be visible light, or may be a light beam of a non-visible wavelength, such as infrared light. Here, when the projector light is visible light, the projector light receiving section and the camera may be the same device. Furthermore, if the color information of the object is not used, in other words, if the visual information is not extracted, then the camera may be omitted.

The computer 3 executes a computation process on the measurement data acquired respectively by the plurality of 3-D distance image sensors 1. More specifically, the patterns irradiated onto the imaging object from the projectors are captured by the light receiving sections. Therefore, the computer 3 is able to calculate the distance between the 3-D distance image sensor 1 and the imaging object, by the principle of trigonometry, by observing distortion in the patterns captured by the light receiving sections.

The measurement data is acquired for each element of the light receiving section. The greater the number of elements with respect to the image angle, the more precise the measurement data that can be acquired. For example, in a case where elements are arranged in a 480 longitudinal by 640 lateral configuration in the light receiving section, it is possible to acquire distance data as a group of three-dimensional points numbering no less than 300,000, in one operation.

The acquired distance data may be handled as a distance image in which the distance is expressed by color shading, or may be acquired as a group of three-dimensional points in which each point has three-dimensional coordinates information in a sensor coordinates system. Three-dimensional measurement is possible by a minimum of one pattern irradiation and one image capture by the light receiving section. Therefore, it is possible to measure three-dimensionally at the imaging frame rate of the light receiving section.

Next, a case is considered in which the elevator shaft is measured while moving the 3-D distance image sensors 1 which have a configuration of this kind. It is supposed that the 3-D distance image sensor 1 is installed horizontally, and that the possible measurement range in the vertical direction is 1 m, and it is also supposed that the frame rate of the 3-D distance image sensor 1 is 30 frames per second, which is the same as a general video camera.

Based on these suppositions, it is possible to carry out measurement at 30 m per second, if measurement is carried out so as to avoid measurement errors while moving the sensor in the vertical direction. As a result of this, the group of three-dimensional points that can be acquired is 9,000,000 points per second. From the above, by using the 3-D distance image sensors 1, it is possible to achieve fast and precise measurement.

Figure 2:
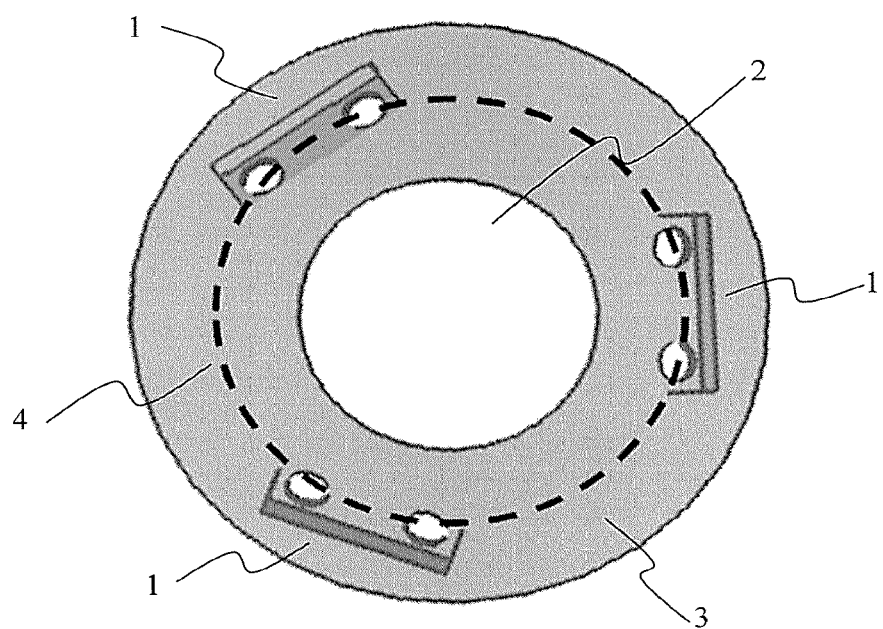
FIG. 2 is a top view showing an example of the arrangement of constituent elements of an elevator shaft dimensions measurement device according to the first embodiment of the present invention.

The arrangement of the 3-D distance image sensors 1 is studied below. FIG. 2 is a top view showing an example of the arrangement of constituent elements of an elevator shaft dimensions measurement device according to the first embodiment of the present invention. Furthermore, FIG. 3 is a side view showing an example of the arrangement of constituent elements of an elevator shaft dimensions measurement device according to the first embodiment of the present invention.

In the elevator shaft dimensions measurement device according to the present invention, a plurality of 3-D distance image sensors 1 are arranged at even intervals apart on the circumference of the same circle 4 which is the reference of the sensor arrangement. Moreover, the optical axes of the 3-D distance image sensors 1 are directed towards the center of the circle and are arranged at a uniform elevation angle θ from the plane of installation, towards the direction of irradiation of the light 2. In FIG. 3, D-axis means the optical axis direction.

Figure 3:
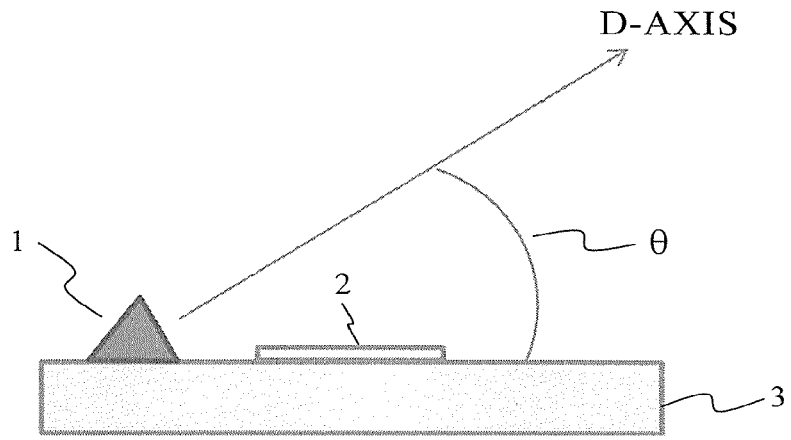
FIG. 3 is a side view showing an example of the arrangement of constituent elements of an elevator shaft dimensions measurement device according to the first embodiment of the present invention.

Here, a case is envisaged in which 3-D distance image sensors 1 are arranged centrally in the elevator shaft, and the optical axis direction is set to the horizontal direction, unlike the arrangement of the present invention illustrated in FIGS. 2 and 3. In this case, supposing that the horizontal image angle of each 3-D distance image sensor 1 is set to 60 degrees, then in order to cover a 360-degree horizontal field of view of the elevator shaft, six 3-D distance image sensors 1 are required.

Figure 4A:
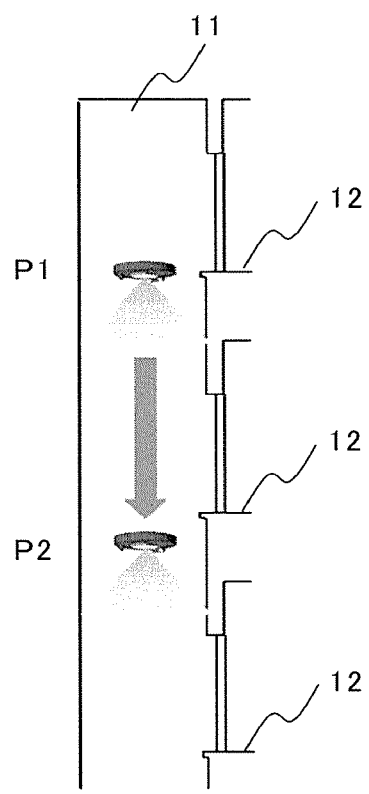
FIG. 4A is an illustrative diagram showing a view of the measurement of the interior of the elevator shaft.
Figure 4B:
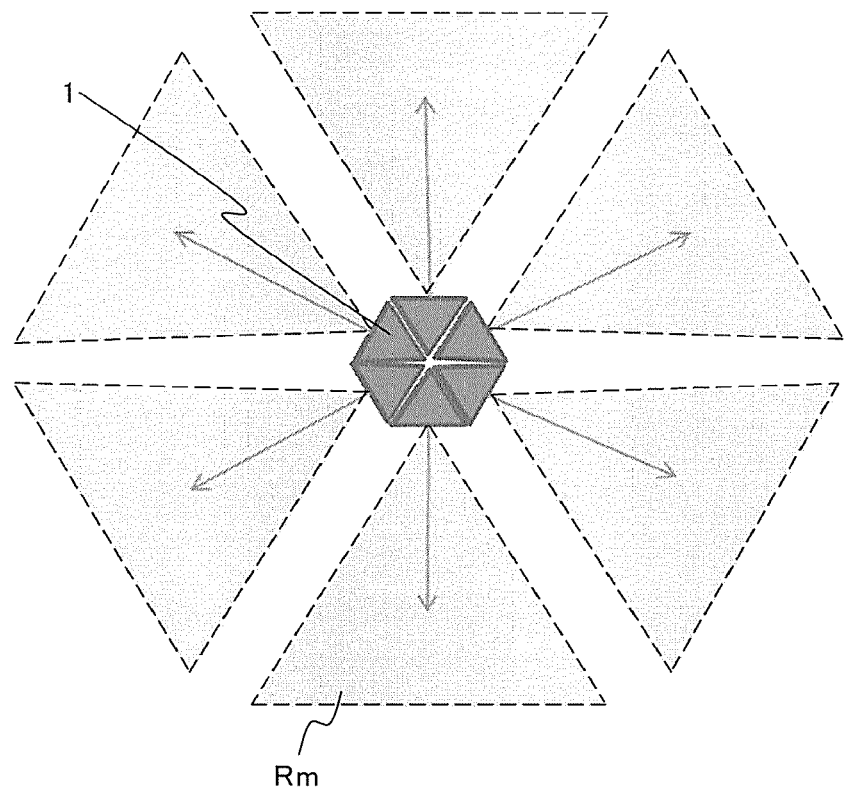
FIG. 4B is a diagram showing a measurement range when six 3-D distance image sensors are used.

FIG. 4A is an illustrative diagram showing a view of the measurement of the interior of the elevator shaft, and FIG. 4B is a diagram showing a measurement range when six 3-D distance image sensors 1 are used. More specifically, the elevator shaft dimensions measurement device according to the present invention is disposed in the center of the elevator shaft 11, and the dimensions of the interior of the elevator shaft are measured while performing an ascending and descending operation inside the elevator shaft. In FIG. 4a, the elevator shaft dimensions measurement device before movement is indicated by P1, and the elevator shaft dimensions measurement device after movement is indicated by P2.

Furthermore, as shown in FIG. 4B, when six 3-D distance image sensors 1 having a horizontal image angle of 60 degrees are installed, then measurement data is gathered in the measurement range Rm surrounded by the dotted lines, by the respective sensors.

Figure 5A:
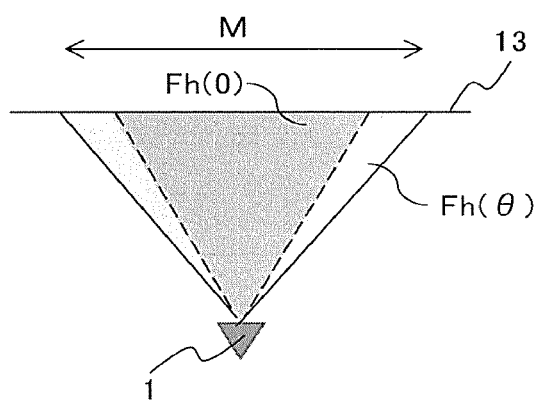
FIG. 5A is a top view showing the enlargement of the visible range when there is an elevation angle of θ, in the elevator shaft dimensions measurement device according to the first embodiment of the present invention.
Figure 5B:
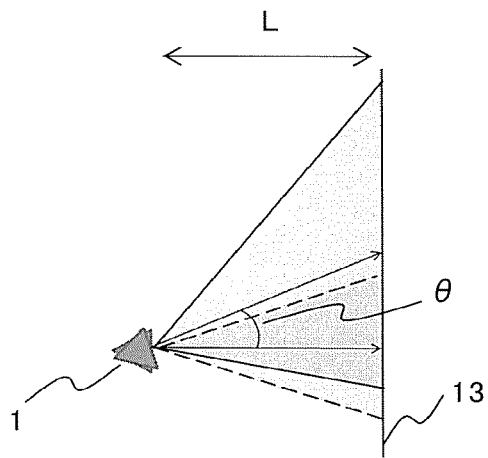
FIG. 5B is a side view showing the enlargement of the visible range when there is an elevation angle of θ, in the elevator shaft dimensions measurement device according to the first embodiment of the present invention.

On the other hand, with the arrangement of the present invention, the possible measurement range is enlarged by inclining the optical axis direction at the elevation angle θ. FIG. 5A is a top view showing the enlargement of the field of view range when there is an elevation angle of θ, in the elevator shaft dimensions measurement device according to the first embodiment of the present invention. FIG. 5B is a side view showing the enlargement of the field of view range when there is an elevation angle of θ, in the elevator shaft dimensions measurement device according to the first embodiment of the present invention.

In FIGS. 5A and 5B, the region indicated by the dotted lines is the field of view range when the elevation angle is 0 degrees, and the region indicated by the solid lines is the field of view range when the elevation angle is θ degrees. Taking the direction along the optical axis into consideration, and it supposes that the distance to a elevator shaft wall surface 13 in the horizontal direction is L. In this case, by inclining the optical axis by the elevation angle θ, the distance from the 3-D distance image sensors 1 to the elevator shaft wall surface 13 substantially becomes longer, and consequently, the possible measurement range becomes broader. FIG. 5A shows that the horizontal field of view Fh(θ) when the elevation angle is θ degree is broader than the horizontal field of view Fh(0) when the elevation angle is 0 degree.

Figure 6:
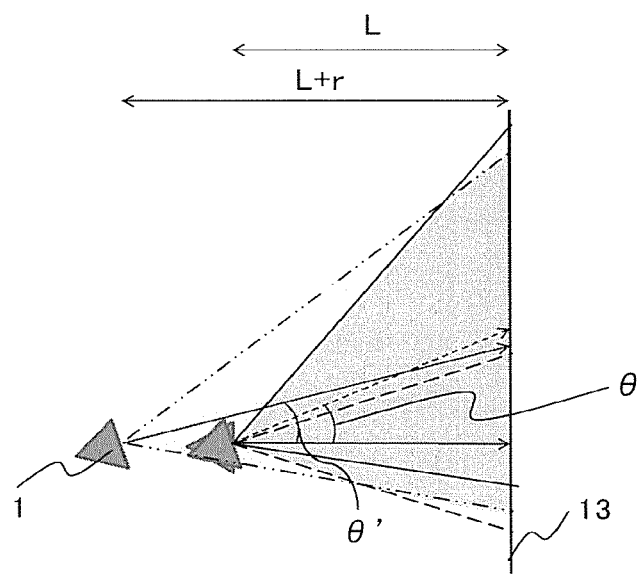
FIG. 6 is an illustrative diagram showing an enlargement of the visible range when the distance between the wall which is the imaging object, and the 3-D distance image sensor, is made longer, in the elevator shaft dimensions measurement device according to the first embodiment of the present invention.

Furthermore, FIG. 6 is an illustrative diagram showing an enlargement of the field of view range when the distance between the elevator shaft wall surface 13 which is the imaging object, and the 3-D distance image sensor, is made longer, in the elevator shaft dimensions measurement device according to the first embodiment of the present invention.

In FIG. 6, the region indicated by the dotted lines is the field of view range when the distance to the elevator shaft wall surface 13 is L and the elevation angle is θ degrees, the region indicated by the solid lines is the field of view range when the distance to the elevator shaft wall surface 13 is L and the elevation angle is θ degrees, and the region indicated by the double-dotted lines is the field of view range when the distance to the elevator shaft wall surface 13 is L+r and the elevation angle is θ'. As described below, the relationship between the elevation angles θ and θ' is θ'<θ.

As shown in FIG. 6, by arranging the 3-D distance image sensors 1 on the same circle and so as to face towards the center of the circle, it is possible to lengthen the distance from the elevator shaft wall surface 13 by r, compared to when the 3-D distance image sensors 1 are arranged at the center of the elevator shaft. Here, r corresponds to the radius of the circle when the 3-D distance image sensors 1 are arranged on the same circle.

As a result of this, the measurable range is further enlarged. When viewed in the horizontal cross-section of the elevator shaft, this enlargement of the measurement range can be regarded as substantially increasing the horizontal image angle. Consequently, according to the sensor arrangement of the present invention, it is possible to cover 360 degrees in the horizontal direction of the elevator shaft, with a small number of 3-D distance image sensors 1, compared to a case where the 3-D distance image sensors 1 are simply arranged in the center of the elevator shaft so as to be directed in a radiating fashion.

In the case of a radial arrangement such as that shown in FIG. 4B, the image angle H in the horizontal direction which is required in each of the 3-D distance image sensors 1 is given by Expression (1) below, when n 3-D distance image sensors 1 are used.

$$H = 360/n \qquad (1)$$

For example, if the number of 3-D distance image sensors 1 is n=3, then when the 3-D distance image sensors 1 are arranged in the center of the elevator shaft, the image angle H in the horizontal direction for each 3-D distance image sensor 1 needs to be no less than 120 degrees.

The possible measurement range M[m] in the horizontal direction at a position distanced by the distance L[m] from the center position of the elevator shaft to the wall surface is expressed by the following Expression (2), when the horizontal image angle of the 3-D distance image sensor 1 is H=120 degrees.

$$M = 2L \tan(120°/2) \qquad (2)$$

In order to arrange the 3-D distance image sensors 1 on a device so as to achieve a measurement range corresponding to a horizontal image angle of 120 degrees, the sensor elevation angle θ [degrees] should be determined in order to satisfy the possible measurement range M[m], in the horizontal cross-section of the elevator shaft.

Here, if the actual horizontal image angle of the 3-D distance image sensor 1 is taken to be φ [degrees], the possible measurement range M'[m] in the horizontal cross-section when the distance to the wall surface in the direction along the optical axis which is inclined by the sensor elevation angle θ [degrees] is D[m] is represented by Expression (3) below.

$$M' = 2D \tan(\phi/2) \qquad (3)$$

A case is considered where the possible measurement range of the 3-D distance image sensor 1 is equivalent to a horizontal image angle of 120 degrees, in other words, where M' in Expression (3) above is equal to M in Expression (2) above. In this case, the distance D[m] to the wall surface in the direction along the sensor elevation angle θ [degrees] is calculated by Expression (4) below, from Expression (2) and Expression (3) above.

$$D = M/2 \tan(\phi/2) \qquad (4)$$

Consequently, the sensor elevation angle θ [degrees] is calculated by Expression (5) below.

$$\theta = \cos^{-1}(L/D) \qquad (5)$$

The measurement device according to the present invention is installed in the center of the elevator shaft, and the center of the circle having a radius r[m] on which the 3-D distance image sensors 1 are arranged is taken to be located at the center of the device. In this case, the actual distance to the wall surface in the direction along the optical axis is longer by the radius r of the circle, as shown in FIG. 6. Therefore, Expression (5) above becomes Expression (6) below.

$$\theta' = \cos^{-1}((L+r)/D) \qquad (6)$$

As a result of this, as shown in FIG. 6, it is possible to ensure the necessary horizontal measurement range by a sensor elevation angle θ' [degrees] that is smaller than the sensor elevation angle θ [degrees] when the 3-D distance image sensors 1 are arranged in the center of the device.

In general, a distance measurement sensor based on an optical system has lower measurement accuracy if the angle of the measurement object surface with respect to the optical axis of the sensor is large, in other words, if the sensor elevation angle θ' [degrees] is large. On the other hand, in the sensor arrangement according to the present invention, by making the radius r of the circle on which the 3-D distance image sensors 1 are arranged large, it is possible to reduce the sensor elevation angle θ' [degrees]. Therefore, a beneficial effect is obtained in that it is possible to prevent decrease in the measurement accuracy.

In this case, if the measurement accuracy for each sensor elevation angle θ' [degrees] of the 3-D distance image sensors 1 is known, it is possible to determine a suitable sensor elevation angle θ' [degrees] on the basis of the target measurement accuracy. Moreover, if the sensor elevation angle θ' [degrees] is known, then it is possible to calculate parameters relating to the sensor arrangement, such as the horizontal image angle of the sensors φ [degrees], the number of sensors n, and the radius r[m] of the circle on which the 3-D distance image sensors 1 are arranged. In this way, it is possible to determine the sufficient configuration of the measurement device required for the application scenario.

Figure 7:
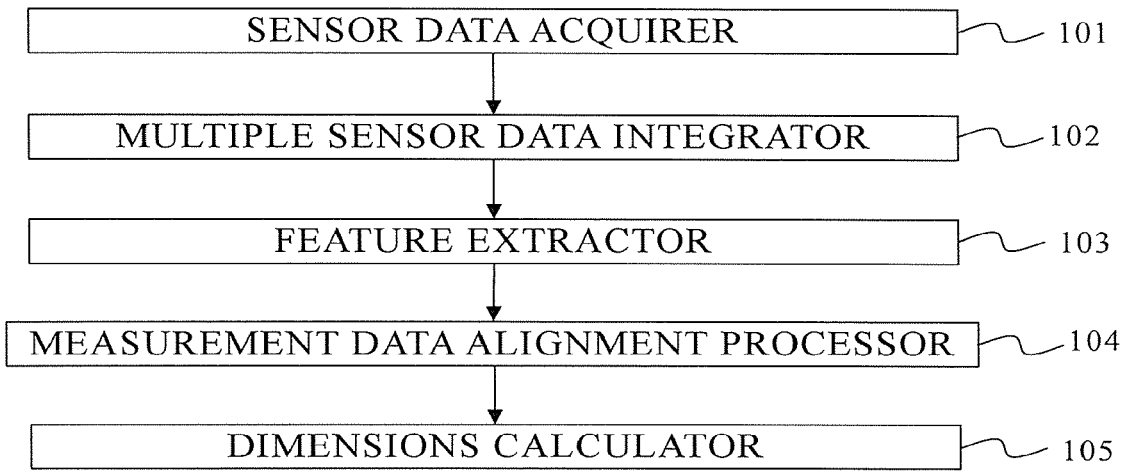
FIG. 7 is a functional block diagram of an elevator shaft dimensions measurement device according to the first embodiment of the present invention.
Figure 8:
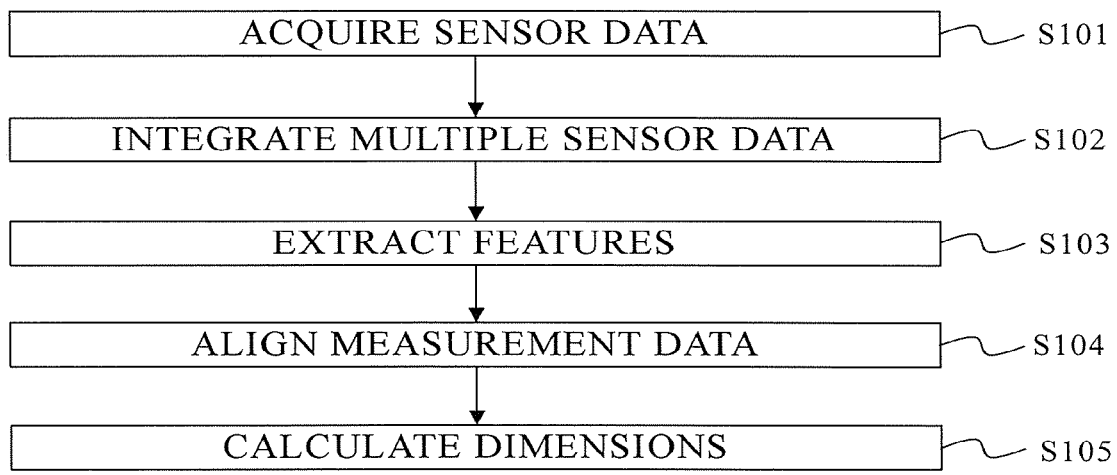
FIG. 8 is a flowchart showing a series of processes of an elevator shaft dimensions measurement device according to the first embodiment of the present invention.

Next, a specific dimensions measurement process by an elevator shaft dimensions measurement device according to the first embodiment will be described using a functional block diagram and a flowchart. FIG. 7 is a functional block diagram of an elevator shaft dimensions measurement device according to the first embodiment of the present invention. Furthermore, FIG. 8 is a flowchart showing a series of processes of an elevator shaft dimensions measurement device according to the first embodiment of the present invention.

Firstly, in step S101, a sensor data acquirer 101 acquires measurement data from the 3-D distance image sensors 1 and saves the data in a computer 3.

Next, in step S102, a plurality of sensor data integrators 102 integrate the measurement data obtained from the plurality of 3-D distance image sensors 1, and generate first integrated measurement data. The plurality of sensor data integrators 102 use the relationship between the positions and attitudes of the 3-D distance image sensors 1 on the device as acquired previously by calibration to mutually superimpose the measurement data obtained from the 3-D distance image sensors 1.

In this way, by integrating the measurement data obtained from the plurality of 3-D distance image sensors 1, it is possible to handle the data as measurement data obtained from a single 3-D distance image sensor 1 having a broad field of view.

If the plurality of 3-D distance image sensors 1 are arranged in such a manner that the fields of view thereof are overlapping, then it is possible to integrate the measurement data obtained from the plurality of sensors by mutually associating and aligning the overlapping portions in measurement data obtained from different 3-D distance image sensors 1.

In this case, a benefit is obtained in that there is no need to calibrate the device in advance in respect of the positions and attitudes of the 3-D distance image sensors 1. On the other hand, the number of alignment operations required for the measurement data increases with the number of sensors, and hence there is a drawback in that the processing takes time. Furthermore, if there are no shaped-related or visual features, for instance, if the overlapping portions of the fields of view are in a monochrome flat surface, then there is a drawback in that it is difficult to align the measurement data.

Next, the data in the first integrated measurement data that has been acquired at different points or timings is aligned. In order to perform this alignment, it is necessary to know where the corresponding positions are located in the different first integrated measurement data. Therefore, in step S103, a feature extractor 103 extracts features for use in associating the first integrated measurement data, from the first integrated measurement data.

When using a camera, it is possible to extract visual features from the camera images, and to use same for associating the first integrated measurement data. The visual features may be found by extracting apparent corners and/or line segments of the object, or by storing particular texture patterns and matching the acquired images to these patterns.

Furthermore, if using measurement data acquired via a light receiving section, it is also possible to extract three-dimensional shape-related features from the first integrated measurement data, and to use these features for associating the first integrated measurement data. Shape-related features may be found by extracting corners, ridgelines or plane surfaces of an object, or by storing particular shape patterns based on 3-D CAD data, or primitive shape patterns (sphere, square, etc.), and matching the acquired measurement data to these patterns.

Furthermore, when associating the first integrated measurement data, it is possible to combine the use of visual features and shape-related features. If both types of features are used, then it is possible to obtain both the advantages of the visual features, which enable easy association of different first integrated measurement data, and the advantages of the shape-related features from which the three-dimensional information required for alignment of the first integrated measurement data is obtained, and therefore, it is possible to achieve highly accurate alignment.

If the visual features are used and the interior of the elevator shaft is dark, then a light 2 is needed to illuminate the interior of the elevator shaft. The light 2 may be installed inside the elevator shaft or may be mounted on the elevator shaft dimensions measurement device. If the light 2 is installed in the elevator shaft, then the direction of illumination does not change with the position of the elevator shaft dimensions measurement device. Therefore, an advantage is obtained in that the features can be extracted and associated easily.

On the other hand, when the light 2 is mounted on the elevator shaft dimensions measurement device, then it is possible to maintain a uniform amount of light within the field of view, at all times. Therefore, an advantage is obtained in that there is no need to dynamically adjust the exposure time of the camera mounted on the 3-D distance image sensors 1, and stable image capture can be expected. Furthermore, apparent changes in the features depending on the direction of the light 2 can be resolved by applying a feature extraction method that is robust with respect to changes in illumination.

Next, in step S104, the measurement data alignment processor 104 uses the feature correspondence relationship between the first integrated measurement data described above, to carry out alignment of the first integrated measurement data acquired at different points or different timings, thereby generating second integrated measurement data after the alignment.

This alignment is equivalent to solving an optimization problem for the measurement data having a total of six degrees of freedom, namely, three degrees of freedom in the translation direction and three degrees of freedom in the rotational direction. Solving this entirely in an exploratory fashion would require a very long processing time. However, if the shape-related features, such as ridgelines and flat surfaces, etc. have been associated, then it is possible to reduce the degrees of freedom of the alignment. As a result of this, it is possible to greatly reduce the processing time.

For example, if one flat surface is associated between the measurement data, then the translation direction for alignment is limited to movement in the plane of that surface. Consequently, the degrees of freedom of the translation direction are reduced from three to two.

Furthermore, the direction of rotation for alignment is limited to rotation having one degree of freedom, the axis of rotation being the direction normal to the flat surface. Consequently, the degrees of freedom of the rotation direction are reduced from three to one. When using a combination of a plurality of shape-related features, the degrees of freedom are reduced further and it is possible to shorten the calculation time required for alignment, and to improve the accuracy.

Next, in step S105, the dimensions calculator 105 calculates the dimensions of the elevator shaft, by using second integrated measurement data after the alignment for the whole elevator shaft, as acquired by the alignment process. Here, the dimensions of the elevator shaft means the height from the floor to the ceiling of the elevator shaft, and the distances between objects, such as the wall surfaces and elevator components, etc. in the horizontal cross-section of the second integrated measurement data.

The dimensions of the horizontal cross-section may be calculated as the shortest distance, or the average distance between a specified reference point inside the elevator shaft and a group of three-dimensional points obtained by measuring the wall surfaces and/or existing elevator components. Furthermore, the reference point inside the elevator shaft may be the center of gravity of the measurement data in the horizontal cross-section, or may be any reference point selected manually.

As described above, according to the first embodiment, it is possible to measure the dimensions of an elevator shaft quickly and precisely, by using a plurality of 3-D distance image sensors capable of acquiring precise measurement data. Moreover, the 3-D distance image sensors are arranged on the same circle so as to face towards the center of the circle, and are inclined at an elevation angle. As a result of this, it is possible to achieve a horizontal-direction field of view which covers the whole elevator shaft, with a small number of sensors, compared to arranging the 3-D distance image sensors in the horizontal direction and in the center of the device.

Consequently, the elevator shaft dimensions measurement device according to the present invention achieves excellent beneficial effects in that the device can be simplified and made compact in size, in addition to achieving higher speed and higher accuracy in the measurement of elevator shaft dimensions.

Second Embodiment

In a second embodiment of the invention, a reference object extractor 106 is further provided in the elevator shaft dimensions measurement device according to the first embodiment, and this configuration is described here with reference to a functional block diagram and flowchart.

Figure 9:
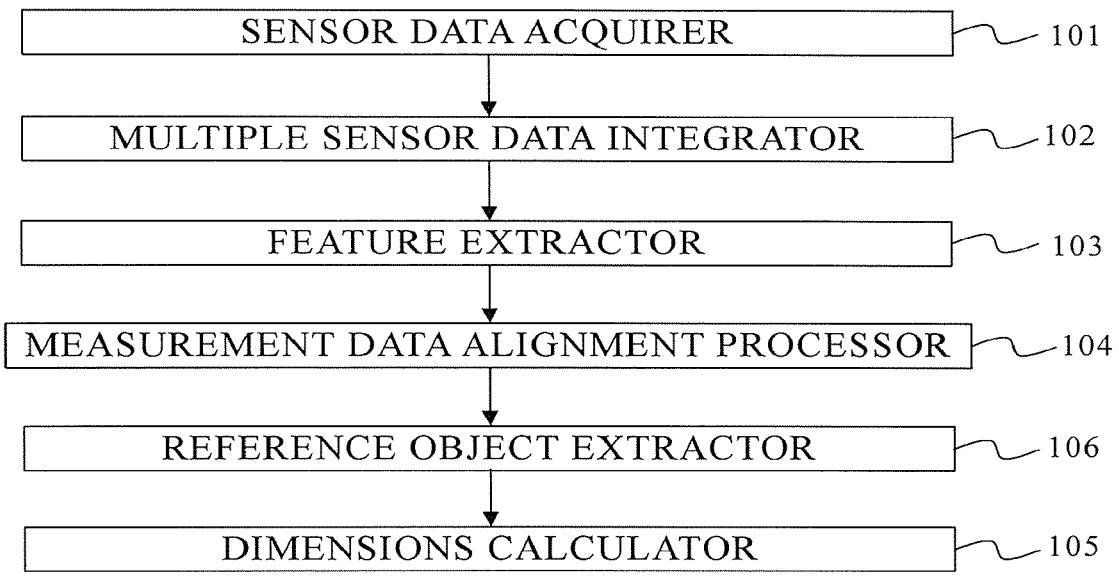
FIG. 9 is a functional block diagram of an elevator shaft dimensions measurement device according to a second embodiment of the present invention.
Figure 10:
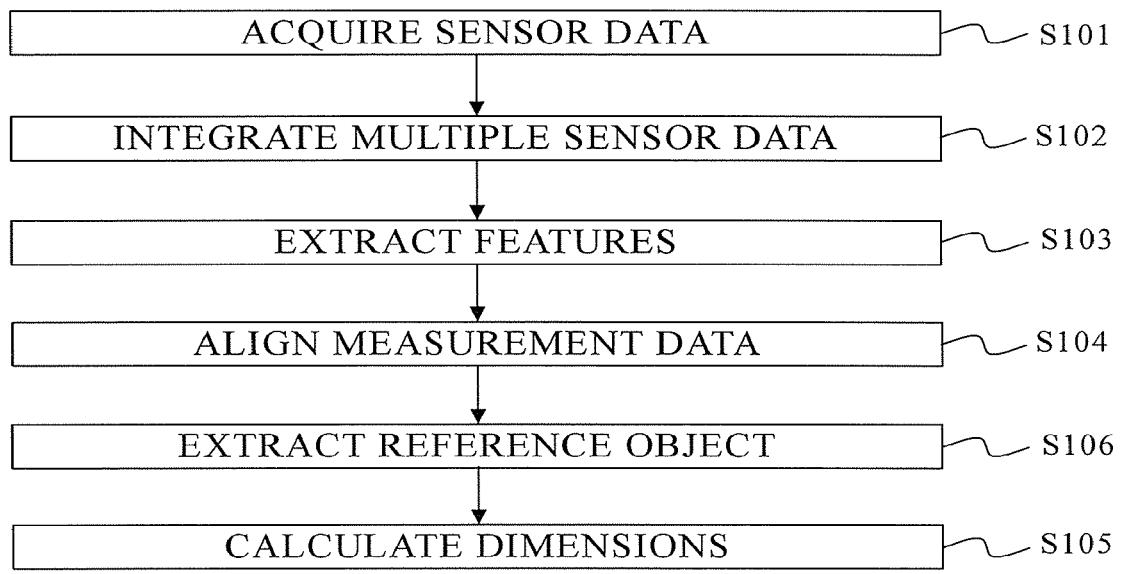
FIG. 10 is a flowchart showing a series of processes of an elevator shaft dimensions measurement device according to the second embodiment of the present invention.

FIG. 9 is a functional block diagram of an elevator shaft dimensions measurement device according to the second embodiment of the present invention. Furthermore, FIG. 10 is a flowchart showing a series of processes of an elevator shaft dimensions measurement device according to the second embodiment of the present invention. The description below centers on the process in step S106 performed by the reference object extractor 106.

In step S106 the reference object extractor 106 extracts an object of a known shape which is present in the elevator shaft, from the second integrated measurement data after the alignment. Thereupon, in step S105, the dimensions calculator 105 uses the position of the object extracted by the reference object extractor 106, as a reference for calculating the dimensions.

Examples of the objects used for reference are components which require good installation accuracy, such as the guide rails or three-sided frame of the elevator car. The shapes of these components are determined by the specifications and since design data for same already exists, then the shape data can be acquired in advance. Furthermore, since the installation accuracy thereof is guaranteed, then these objects are useful as a reference for calculating the dimensions.

Consequently, the reference object extractor 106 can extract components from among the second integrated measurement data after the alignment, by fitting the component shape data with the second integrated measurement data after the alignment. Moreover, the dimensions calculator 105 can use a component extracted by the reference object extractor 106, as a reference for calculating dimensions.

The component shape data may include three-dimensional shape information, such as 3-D CAD data. Furthermore, the component shape data may be two-dimensional cross-sectional data in the case of components which have a constant cross-sectional shape, such as guide rails.

Here, when the object used as a reference for calculating dimensions is different for each building, then in order to compare with the elevator shaft dimensions of the different buildings, and share design data, work is required to recalculate the dimensions on the basis of the same reference. Therefore, the work of comparing dimensions and sharing design data is facilitated by standardizing the object used as a reference.

As described above, according to the second embodiment, a configuration for calculating the dimensions with reference to a component having a guaranteed installation accuracy is provided. As a result of this, it is possible to improve the reliability of the calculated dimensions.

Moreover, by setting a component that is common to elevator shafts as the reference for calculating dimensions, the task of comparison with the elevator shaft dimensions of the different buildings is facilitated. Consequently, in design work for modifying an elevator, it is possible to achieve efficient working, for instance, by partially making shared use of past design data.

Third Embodiment

In a third embodiment of the invention, a case is described, with reference to a functional block diagram and flowchart, in which a guide rail is taken as the object to be extracted, in a concrete example of the reference object extractor 106 described in the second embodiment.

Figure 11:
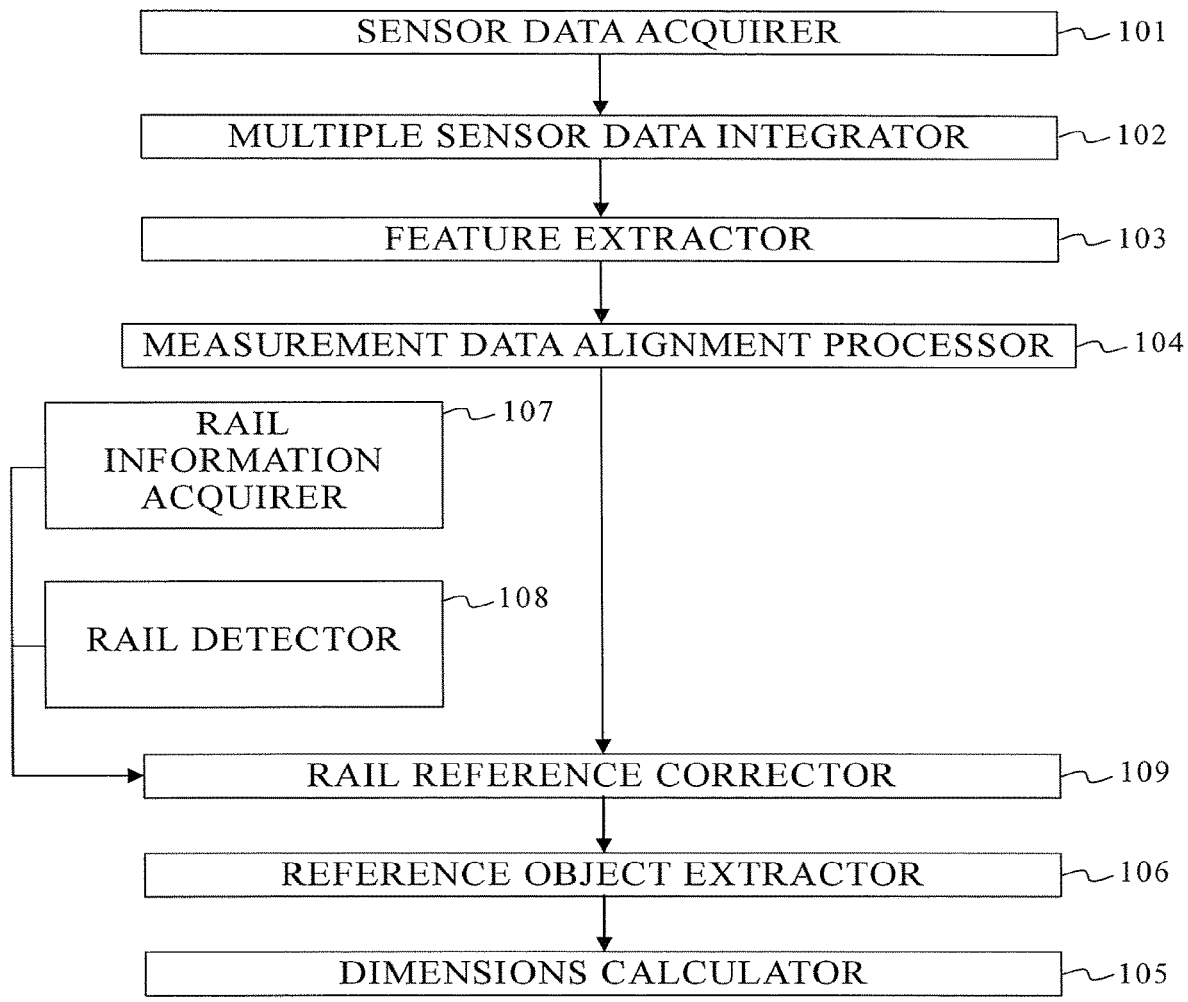
FIG. 11 is a functional block diagram of an elevator shaft dimensions measurement device according to a third embodiment of the present invention.
Figure 12:
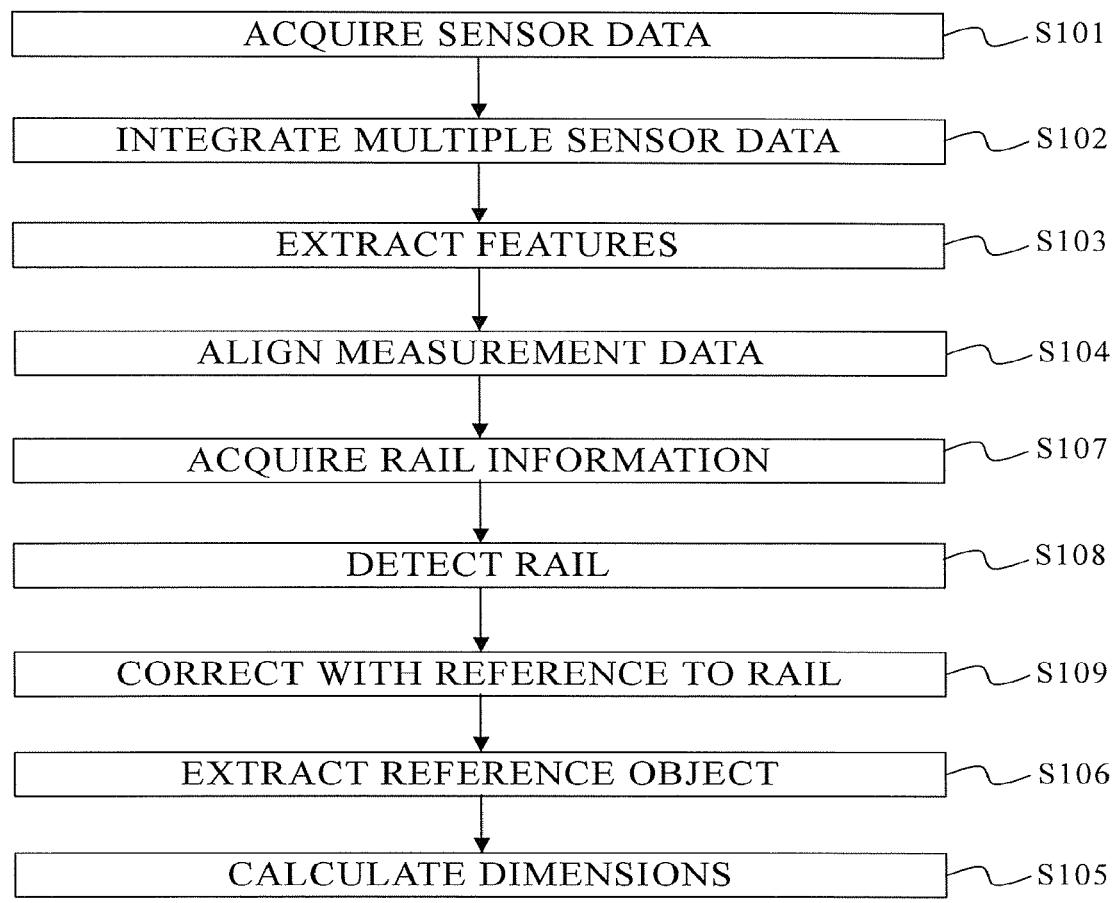
FIG. 12 is a flowchart showing a series of processes of an elevator shaft dimensions measurement device according to the third embodiment of the present invention.

FIG. 11 is a functional block diagram of an elevator shaft dimensions measurement device according to the third embodiment of the present invention. Furthermore, FIG. 12 is a flowchart showing a series of processes of an elevator shaft dimensions measurement device according to the third embodiment of the present invention. In the third embodiment, instead of the reference object extractor 106 according to the second embodiment, a rail information acquirer 107, a rail detector 108 and a rail reference corrector 109 are provided, and the description given below centers on this different configuration and the processes in step S107 to step S109.

In step S107, the rail information acquirer 107 acquires dimensional information for the guide rail of the elevator shaft that is the object of measurement. The dimensional information of the guide rail may be acquired by referring to a database in which the guide rail dimensions are previously registered, or the rail shape may be input manually.

The dimensions of the cross-sectional shape of the guide rail are determined by the specifications, and therefore the dimensional information of the guide rail can be acquired easily, simply by referring to the serial number. The rail information acquirer 107 is able to acquire the distance between two guide rails, either from the design data of the object elevator, or from the results of actual measurement on-site.

Next, in step S108, the rail detector 108 detects the guide rails of the elevator, on the basis of the second integrated measurement data after the alignment, which has been generated in step S104. The detection method may involve using an image captured by the camera to detect an object having the same shape as a guide rail, by pattern matching, or fitting 3-D CAD data of the guide rail to the measurement data obtained as a group of three-dimensional points.

Furthermore, as a further detection method, it is also possible to use the fact that the guide rail has a uniform cross-sectional shape, and to detect the guide rail by pattern matching between the cross-sectional shape of the guide rail and two-dimensional data obtained by projecting the group of three-dimensional points to a plane perpendicular to the lengthwise direction of the guide rail.

If measurement is carried out by arranging the elevator shaft dimensions measurement device in the center of the elevator shaft and moving the elevator shaft dimensions measurement device up and down, then the rear side of the object with respect to the device cannot be measured. Consequently, the shape obtained as a group of three-dimensional points is a portion of the cross-sectional shape of the rail, and there is a risk of decrease in the detection accuracy of the rail position.

Therefore, the rail detector 108 is able to improve the detection accuracy of the rail positions, by using prerequisite conditions, such as the fact that there is a pair of guide rails, that the guide rails are each installed in parallel perpendicularly to the surface of the ground, and that the dimension between the guide rails is always equal.

Next, in step S109, the rail reference corrector 109 corrects the alignment results of the second integrated measurement data after the alignment in step S104, by taking account of the shape of the guide rails of the elevator car. The guide rail is one component having a highly accurate installation position and attitude, among the components constituting the elevator. Therefore, it is possible to improve the measurement accuracy, by correcting the second integrated measurement data after the alignment in such a manner that the guide rails are measured at the design positions and attitudes.

More specifically, it is possible to use the fact that the guide rails are installed perpendicularly with respect to the ground surface, and that the distance between the two guide rails when viewed in a perpendicular direction with respect to the ground surface is the same, whatever the height at which it is measured, in other words, that the two guide rails are parallel to each other.

Furthermore, the 3-D distance image sensors 1 carry out measurement by trigonometry using a projector and a light receiving section. However, measurement error may occur due to deviation in the positional relationship of the projector and the light receiving section during manufacture, depending on the individual sensor. The measurement error here also includes error in the measurement scale caused by deviation in the baseline length between the projector and the light receiving section, and distortion caused by deviation in the optical axis direction.

The measurement error in this case can be corrected previously by calibration. However, it is difficult to reduce the measurement error completely to zero. Therefore, the third embodiment is provided with a configuration for correcting the scale of the measurement data of a single sensor, by enlargement and reduction conversion, using the fact that the rail has a uniform cross-sectional shape.

In addition, the rail reference corrector 109 can also correct measurement data in an individual sensor, by using the fact that the rail does not bend. Moreover, the rail reference corrector 109 can correct the distortion and scale of the measurement data during alignment, by using the fact that the pair of rails are parallel.

Moreover, the rail reference corrector 109 corrects the coordinates system of the measurement data by referring to the direction of the guide rail. To give a specific example, the rail reference corrector 109 converts the coordinates so as to rotate the whole of the measurement data, in such a manner that the Z-axis direction of the coordinates system of the measurement data matches the direction of the guide rail.

When designing an elevator, it is necessary to acquire dimensions within a specified height range, for example, for the first floor. Therefore, in order to acquire an accurate elevator shaft cross-section, it is important to know which direction corresponds to the vertical direction in the measurement data.

The elevator shaft dimensions measurement device according to the third embodiment can acquire the movement path of the device simultaneously, by aligning the measurement data. When measurement is carried out by installing the elevator shaft dimensions measurement device on the elevator car, the movement path might possibly be used as the vertical direction.

However, the measurement data from the 3-D distance image sensors 1 also includes measurement error. Therefore, the movement path thus obtained is not necessarily a straight line. Consequently, if the acquired movement path of the device is used directly as the vertical direction, there is a possibility that an accurate elevator shaft cross-section will not be obtained.

On the other hand, in the third embodiment, by providing a rail information acquirer 107, a rail detector 108 and a rail reference corrector 109, it is possible to correct the coordinates system of the measurement data with reference to the direction of the guide rail. Consequently, it is possible to improve the accuracy of measurement of the elevator shaft dimensions.

If the guide rail of the elevator is used as a reference object in the reference object extractor 106, then it is possible to share the use of guide rail information detected by the rail detector 108.

As described above, according to the third embodiment, a configuration is provided which enables the scale and distortion of the measurement data to be corrected by using the guide rail shape and the dimension between rails. Consequently, it is possible to improve the accuracy of measurement of the elevator shaft dimensions.

Moreover, by using the vertical direction relating to the measurement data as the direction of installation of the guide rail, it is possible to acquire an accurate cross-section of the elevator shaft.

Fourth Embodiment

In a fourth embodiment of the invention, a height information acquirer 110 and a height direction corrector 111 are further provided in the elevator shaft dimensions measurement device according to the first to third embodiments, and this configuration is described here with reference to a functional block diagram and flowchart.

Figure 13:
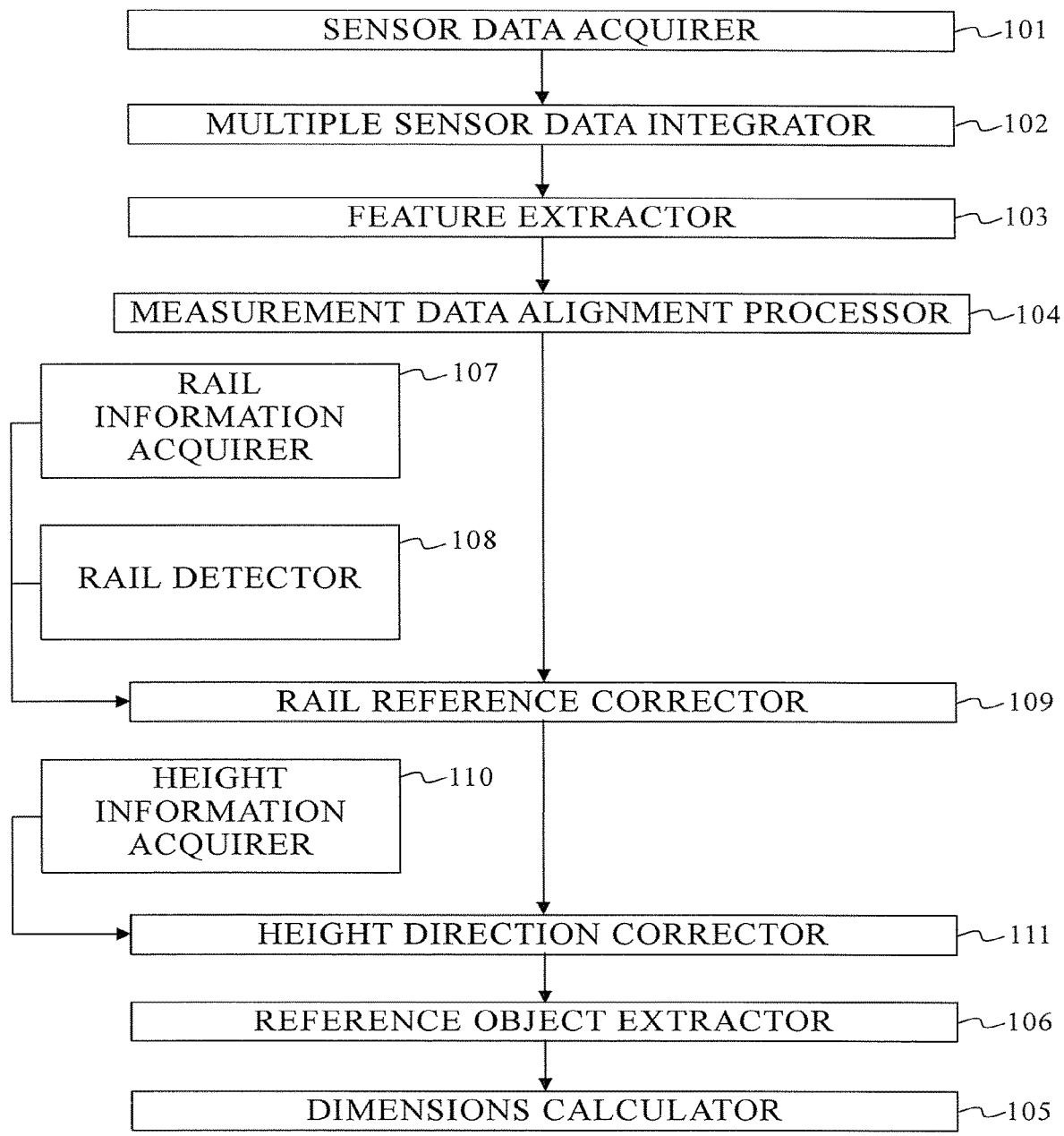
FIG. 13 is a functional block diagram of an elevator shaft dimensions measurement device according to a fourth embodiment of the present invention.
Figure 14:
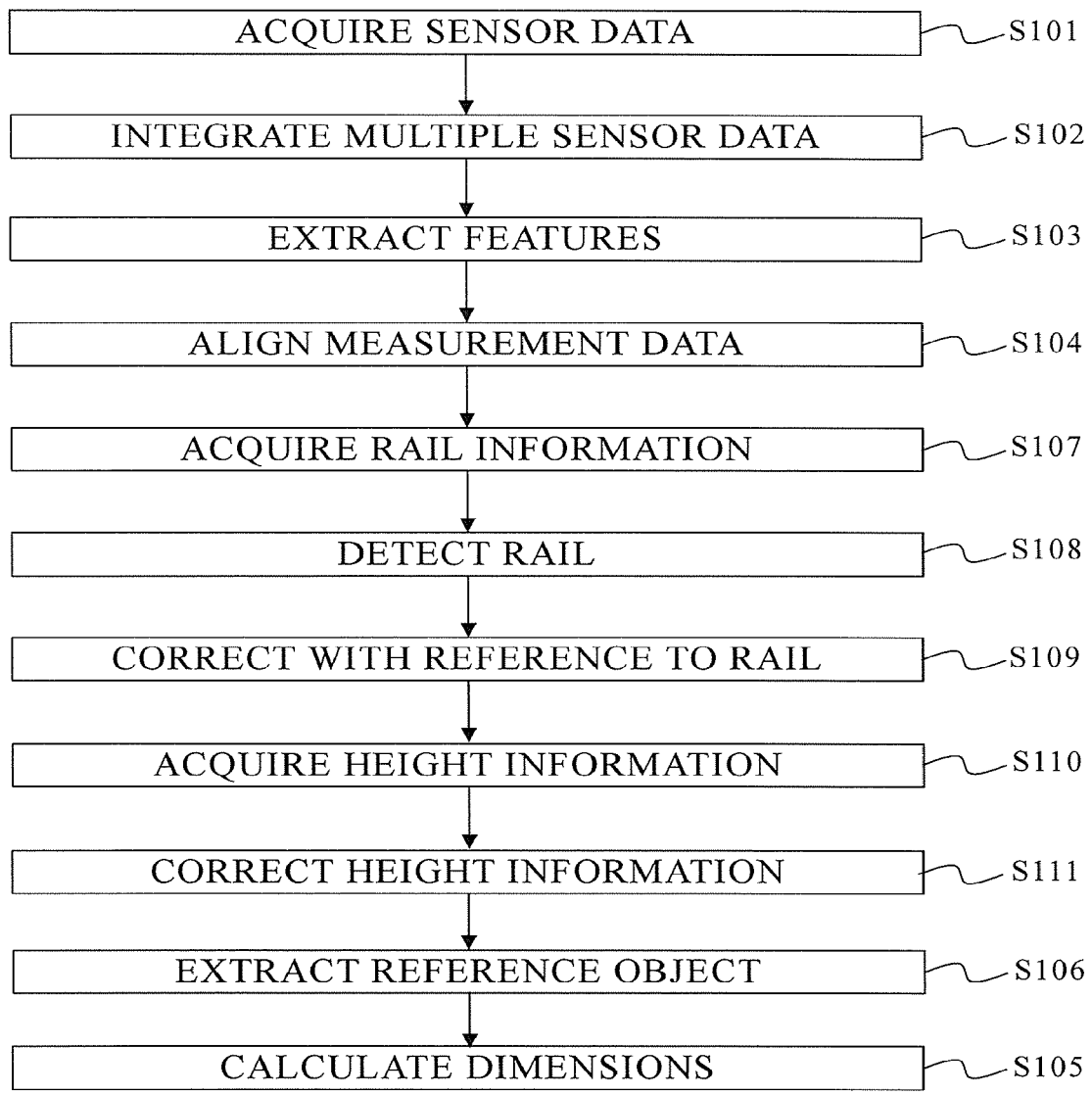
FIG. 14 is a flowchart showing a series of processes of an elevator shaft dimensions measurement device according to the fourth embodiment of the present invention.

FIG. 13 is a functional block diagram of an elevator shaft dimensions measurement device according to the fourth embodiment of the present invention. Furthermore, FIG. 14 is a flowchart showing a series of processes of an elevator shaft dimensions measurement device according to the fourth embodiment of the present invention. In the fourth embodiment, the processes in step S110 and step S111 performed by the height information acquirer 110 and the height direction corrector 111 are added to the third embodiment, and the description below centers on these additional processes.

In step S104, the measurement data alignment processor 104 carries out alignment of the first measurement data, by associating features between the first measurement data at different positions. However, if the interior of the elevator shaft lacks the features required for alignment, then the accuracy of alignment may decline.

An example of such a case is one where the cross-sectional shape of the elevator shaft is the same and changes little in the vertical direction, and where the wall surfaces have little texture. In cases such as this, it is possible to align the measurement data by the uneven shape of the wall surfaces produced by the corners of the elevator shaft, and so on, in the horizontal direction, but the accuracy of alignment in the height direction declines.

This problem can be resolved by using the height information of the device. Any position may be used as a reference for the acquired height information, provided that the amount of relative movement of the 3-D distance image sensor 1 in the height direction, such as the height of the optical center of any of the 3-D distance image sensors 1 with respect to the floor of the elevator shaft, is known.

Therefore, in the description given below, it is supposed that alignment in the horizontal direction has been carried out by the measurement data alignment processor 104 and the rail reference corrector 109, but error has occurred in the alignment in the height direction.

In cases such as this, in step S110, the height information acquirer 110 acquires height information of the device. The remaining degree of freedom is only one degree of freedom along the height direction of the elevator shaft. Therefore, in step S111 after alignment in the horizontal direction, the height direction corrector 111 may correct the alignment in the height direction with reference to the height information acquired in step S110. Accordingly, even in cases where there are few features for use in the alignment inside the elevator shaft, such as when the wall surfaces of the elevator shaft have no texture, it is still possible to measure the dimensions of the interior of the elevator shaft accurately.

Here, it is envisaged that the height information acquirer 110 employs a car installation method in which the position of the elevator car is used as the device height information, when the device is installed in the elevator car.

Other methods that can be envisaged are a sensor addition method in which height information is acquired by adding a sensor, such as a laser distance meter, to the device as a further height information acquirer 110, and a suspension method in which the suspension height is used as the height information of the device, if the dimensions of the interior of the elevator shaft are measured by suspending the device from a special crane, or the like.

Here, in the first car installation method, the state of the car on which the device is installed varies between each elevator. Therefore, the device may be difficult to install on the car. Furthermore, in the second sensor addition method, it is necessary to add a sensor, separately. Moreover, when the device is installed on the car, as well as the problems involved in installation on the car, there is also a problem in that the reliability of the height information acquired by the laser distance meter declines due to oscillation of the car.

On the other hand, in the third suspension method, there is an advantage in that measurement is not affected by the state of the elevator car. However, the suspension method can only be applied to a measurement method in which alignment of the measurement data can be performed by association of features between the measurement data. With the suspension method, it is envisaged that the device may oscillate when suspended, and therefore the accuracy of alignment of the measurement data declines markedly in a measurement method based on scanning of a laser.

If a mechanism is added to the suspension device so as to avoid oscillation of the device, and if the device is suspended by a highly rigid member, such as a metal rod, rather than a wire or other cable-shaped member, then the problems associated with oscillation are resolved. However, problems also arise in relation to the increased complexity and size of the suspension device.

As described above, according to the fourth embodiment, a configuration is provided which enables the height information of the device to be used for alignment in the height direction. Consequently, even in a case where there are few features which can be used for alignment in the elevator shaft, it is still possible to align the measurement data in the height direction, and therefore the measurement accuracy can be improved and the range of application of the device can be increased.

The invention claimed is:

1. An elevator shaft dimensions measurement device, comprising:
   a plurality of 3-D distance image sensors which are arranged on a circumference of a same circle, facing a direction of the center of the circle and inclined at an elevation angle with respect to a horizontal plane, configured to simultaneously measure through 360 degrees in a horizontal direction in an elevator shaft, which irradiate a distance measurement pattern through a measurement range in the horizontal direction and a vertical direction onto inner walls of the elevator shaft that are imaging objects, and which output measurement data configured as a group of three-dimensional points by capturing an image of the distance measurement pattern irradiated onto the inner walls;
   a calculator which calculates dimensions of the elevator shaft over the entire length of the elevator shaft, by calculating distances to the inner walls from the plurality of 3-D distance image sensors, on the basis of the measurement data output respectively from the plurality of 3-D distance image sensors.

2. The elevator shaft dimensions measurement device according to claim 1, wherein
   the calculator integrates the measurement data output from the plurality of 3-D distance image sensors, and calculates dimensions of the elevator shaft over the entire length of the elevator shaft, by calculating distances to the inner walls from the plurality of 3-D distance image sensors, on the basis of integrated measurement data.

3. The elevator shaft dimensions measurement device according to claim 2,
   the calculator comprising:
   a measurement data integrator which integrates the measurement data output respectively from the plurality of 3-D distance image sensors, respectively at a plurality of height positions in the elevator shaft, and generates first integrated measurement data covering 360 degrees in the horizontal direction;
   a measurement data alignment processor which aligns the first integrated measurement data integrated at the plurality of height positions in the elevator shaft, to create second integrated measurement data after the alignment; and
   a dimension calculator which calculates dimensions of the elevator shaft over the entire length of the elevator shaft, by calculating distances to the inner walls from the plurality of 3-D distance image sensors, on the basis of the second integrated measurement data after the alignment.

4. The elevator shaft dimensions measurement device according to claim 3, further comprising:
   a feature extractor which extracts feature data for use when aligning the first integrated measurement data by the measurement data alignment processor, from among the first integrated measurement data generated for the plurality of height positions in the elevator shaft by the measurement data integrator,
   wherein the measurement data alignment processor aligns the first integrated measurement data using the feature data extracted by the feature extractor, to create the second integrated measurement data after the alignment.

5. The elevator shaft dimensions measurement device according to claim 3, further comprising:
   a reference object extractor which extracts a component of a known shape present in the elevator shaft as an object forming a reference for calculation of the dimensions, from among the second integrated measurement data after the alignment generated by the measurement data alignment processor,
   wherein the calculator calculates the dimensions of the elevator shaft over the entire length of the elevator shaft, by using, as a reference for calculating the dimensions, a position of the component of a known shape extracted by the reference object extractor.

6. The elevator shaft dimensions measurement device according to claim 4, further comprising:
   a reference object extractor which extracts a component of a known shape present in the elevator shaft as an object forming a reference for calculation of the dimensions, from among the second integrated measurement data after the alignment generated by the measurement data alignment processor,
   wherein the calculator calculates the dimensions of the elevator shaft over the entire length of the elevator shaft, by using, as a reference for calculating the dimensions, a position of the component of a known shape extracted by the reference object extractor.

7. The elevator shaft dimensions measurement device according to claim 5,
   wherein the reference object extractor includes:
   a rail information acquirer which sets a guide rail of an elevator car as a dimensional measurement object, and acquires dimensions of a cross-sectional shape of the guide rail, and a dimension between rails;
   a rail detector which detects, as a position of the guide rail, a position corresponding to the dimensions of the cross-sectional shape and the dimension between the rails as acquired by the rail information acquirer, from among the second integrated measurement data after the alignment generated by the measurement data alignment processor; and a rail reference corrector which uses the position of the guide rail detected by the rail detector to correct a position of the second integrated measurement data after the alignment generated by the measurement data alignment processor.

8. The elevator shaft dimensions measurement device according to claim 6,
wherein the reference object extractor includes:
a rail information acquirer which sets a guide rail of an elevator car as a dimensional measurement object, and acquires dimensions of a cross-sectional shape of the guide rail, and a dimension between rails;
a rail detector which detects, as a position of the guide rail, a position corresponding to the dimensions of the cross-sectional shape and the dimension between the rails as acquired by the rail information acquirer, from among the second integrated measurement data after the alignment generated by the measurement data alignment processor; and
a rail reference corrector which uses the position of the guide rail detected by the rail detector to correct a position of the second integrated measurement data after the alignment generated by the measurement data alignment processor.

9. The elevator shaft dimensions measurement device according to claim 3, further comprising:
a height information acquirer which acquires information of the plurality of height positions in the elevator shaft, as height information; and
a height direction corrector which uses the height information acquired by the height information acquirer to correct a position of the second integrated measurement data after the alignment generated by the measurement data alignment processor.

10. The elevator shaft dimensions measurement device according to claim 4, further comprising:
a height information acquirer which acquires information of the plurality of height positions in the elevator shaft, as height information; and
a height direction corrector which uses the height information acquired by the height information acquirer to correct a position of the second integrated measurement data after the alignment generated by the measurement data alignment processor.

11. The elevator shaft dimensions measurement device according to claim 5, further comprising:
a height information acquirer which acquires information of the plurality of height positions in the elevator shaft, as height information; and
a height direction corrector which uses the height information acquired by the height information acquirer to correct a position of the second integrated measurement data after the alignment generated by the measurement data alignment processor.

12. The elevator shaft dimensions measurement device according to claim 6, further comprising:
a height information acquirer which acquires information of the plurality of height positions in the elevator shaft, as height information; and
a height direction corrector which uses the height information acquired by the height information acquirer to correct a position of the second integrated measurement data after the alignment generated by the measurement data alignment processor.

13. The elevator shaft dimensions measurement device according to claim 7, further comprising:
a height information acquirer which acquires information of the plurality of height positions in the elevator shaft, as height information; and
a height direction corrector which uses the height information acquired by the height information acquirer to correct the position of the second integrated measurement data after the alignment generated by the measurement data alignment processor.

14. The elevator shaft dimensions measurement device according to claim 8, further comprising:
a height information acquirer which acquires information of the plurality of height positions in the elevator shaft, as height information; and
a height direction corrector which uses the height information acquired by the height information acquirer to correct the position of the second integrated measurement data after the alignment generated by the measurement data alignment processor.

15. An elevator shaft dimensions measurement method for calculating dimensions of an elevator shaft over an entire length of the elevator shaft, by data processing, using a computer, of detection results from a plurality of 3-D distance image sensors which are arranged on a circumference of a same circle, facing the direction of the center of the circle and inclined at an elevation angle with respect to a horizontal plane, configured to simultaneously measure through 360 degrees in a horizontal direction in the elevator shaft, which irradiate a distance measurement pattern through a measurement range in the horizontal direction and a vertical direction onto inner walls of the elevator shaft that are imaging objects, and which output measurement data configured as a group of three-dimensional points by capturing an image of the distance measurement pattern irradiated onto the inner walls,
the method comprising:
a data acquisition of acquiring the measurement data output respectively from the plurality of 3-D distance image sensors;
a dimension calculation of calculating dimensions of the elevator shaft over the entire length of the elevator shaft, by calculating distances to the inner walls from the plurality of 3-D distance image sensors, on the basis of the measurement data output respectively from the plurality of 3-D distance image sensors and acquired in the data acquisition.

\* \* \* \* \*